United States Patent
Nguyen

(10) Patent No.: US 10,426,148 B2
(45) Date of Patent: Oct. 1, 2019

(54) CRAB POT

(71) Applicant: Nho Nguyen, Bellingham, WA (US)

(72) Inventor: Nho Nguyen, Bellingham, WA (US)

( * ) Notice: Subject to any disclaimer, the term of this patent is extended or adjusted under 35 U.S.C. 154(b) by 174 days.

(21) Appl. No.: 14/971,025

(22) Filed: Dec. 16, 2015

(65) Prior Publication Data

US 2017/0172122 A1    Jun. 22, 2017

(51) Int. Cl.
| | |
|---|---|
| *A01K 69/08* | (2006.01) |
| *A01K 69/10* | (2006.01) |
| *A01K 69/06* | (2006.01) |
| *A01M 23/08* | (2006.01) |
| *A01M 23/18* | (2006.01) |

(52) U.S. Cl.
CPC ............. *A01K 69/08* (2013.01); *A01K 69/06* (2013.01); *A01K 69/10* (2013.01); *A01M 23/08* (2013.01); *A01M 23/18* (2013.01)

(58) Field of Classification Search
CPC ........ A01K 69/06; A01K 69/08; A01K 69/10; A01M 23/16; A01M 23/18; A01M 23/20; A01M 23/02; A01M 23/08
USPC ............................ 43/100, 105, 65–67, 60, 61
See application file for complete search history.

(56) References Cited

U.S. PATENT DOCUMENTS

| | | | | |
|---|---|---|---|---|
| 693,391 | A * | 2/1902 | Holland .................. | A01K 69/06 43/100 |
| 934,469 | A * | 9/1909 | Shoup .................... | A01M 23/08 43/66 |
| 986,010 | A * | 3/1911 | Kennedy ................ | A01M 23/18 43/61 |
| 1,010,256 | A * | 11/1911 | Harris .................... | A01M 23/08 43/66 |
| 1,074,916 | A * | 10/1913 | Wiesen .................. | A01M 21/00 43/65 |
| 1,363,626 | A * | 12/1920 | Thomas ................. | A01M 23/20 43/66 |
| 1,397,471 | A * | 11/1921 | Walker .................... | E03F 7/06 210/131 |

(Continued)

FOREIGN PATENT DOCUMENTS

| | | | | |
|---|---|---|---|---|
| FR | 2691612 | A1 * | 12/1993 | .............. A01K 69/06 |
| GB | 2174581 | A * | 11/1986 | .............. A01K 69/08 |

(Continued)

OTHER PUBLICATIONS

Translation of JP 2651899.*

(Continued)

*Primary Examiner* — Darren W Ark
(74) *Attorney, Agent, or Firm* — Michael R. Schacht; Schacht Law Office, Inc.

(57) ABSTRACT

A crab pot including a top, a bottom, and at least one side wall disposed between the top and the bottom, the top, bottom, and the at least one side wall being supported by a frame and enclosing an interior space. The crab pot further includes at least one entrance tunnel in the at least one side wall to permit entry of an animal into the interior space, the at least one entrance tunnel including a first end adjacent the at least one side wall and a second end opposite the first end, the second end disposed within the interior space. The crab pot also includes a trigger including at least one rod pivotably mounted at the second end of the at least one entrance tunnel.

9 Claims, 5 Drawing Sheets

(56) References Cited

U.S. PATENT DOCUMENTS

| | | | | |
|---|---|---|---|---|
| 1,422,894 A * | 7/1922 | Skubinski | A01M 23/00 | 43/66 |
| 1,501,378 A * | 7/1924 | Talisman | A01M 23/14 | 43/69 |
| 1,505,996 A * | 8/1924 | Drought | A01M 23/00 | 43/66 |
| 1,614,450 A * | 1/1927 | Alburtis | A01M 23/00 | 43/61 |
| 1,618,513 A * | 2/1927 | Coghill | A01M 23/08 | 43/66 |
| 1,744,412 A * | 1/1930 | Patterson | A01M 23/18 | 43/100 |
| 1,773,324 A * | 8/1930 | Sperling | A01K 69/06 | 43/100 |
| 1,815,541 A * | 7/1931 | Bohannon | A01M 23/00 | 43/61 |
| 1,877,712 A * | 9/1932 | Zelma | A01M 23/00 | 43/61 |
| 1,911,919 A * | 5/1933 | Molls | A01M 23/08 | 43/66 |
| 2,129,594 A * | 9/1938 | Shimamoto | A01M 23/18 | 43/61 |
| 2,178,789 A * | 11/1939 | Heath | A01M 23/08 | 43/66 |
| 2,284,867 A * | 6/1942 | Harris | A01M 23/18 | 43/61 |
| 2,374,522 A * | 4/1945 | Andrews | A01M 23/22 | 43/61 |
| 2,377,967 A * | 6/1945 | Eulie | A01M 23/20 | 43/61 |
| 2,478,605 A * | 8/1949 | Symens | A01M 23/20 | 43/61 |
| 2,488,202 A * | 11/1949 | Kern | A01M 23/18 | 43/61 |
| 2,530,449 A * | 11/1950 | Ean | A01K 69/08 | 43/102 |
| 2,589,002 A * | 3/1952 | Vonada | A01M 23/18 | 43/61 |
| 2,598,007 A * | 5/1952 | McCormick | A01M 23/18 | 43/61 |
| 2,599,017 A * | 6/1952 | Rogers | A01M 23/20 | 43/61 |
| 2,616,210 A * | 11/1952 | Reeb | A01M 23/18 | 43/61 |
| 2,693,050 A * | 11/1954 | Neid | A01M 23/18 | 217/57 |
| 2,760,297 A * | 8/1956 | Buyken | A01K 69/08 | 43/105 |
| 2,787,082 A * | 4/1957 | Paschen | A01M 23/08 | 43/66 |
| 2,908,993 A * | 10/1959 | Webb | A01K 69/08 | 43/102 |
| 2,995,861 A * | 8/1961 | Osborn | A01M 23/18 | 43/66 |
| 3,125,823 A * | 3/1964 | Smith | A01M 23/18 | 43/76 |
| 3,271,894 A * | 9/1966 | Manno | A01K 69/08 | 43/100 |
| 3,373,523 A * | 3/1968 | Olafson | A01K 69/08 | 43/100 |
| 3,497,989 A * | 3/1970 | Manno | A01K 69/08 | 43/100 |
| 3,786,591 A * | 1/1974 | Morford | A01M 23/08 | 43/66 |
| 3,795,073 A * | 3/1974 | Olsen | A01K 69/08 | 43/100 |
| 3,834,063 A * | 9/1974 | Souza | A01M 23/02 | 43/61 |
| 3,906,655 A * | 9/1975 | Lowenthal, Jr. | A01K 69/08 | 43/100 |
| 3,991,508 A * | 11/1976 | Petrosky | A01M 23/08 | 43/66 |
| 4,075,779 A * | 2/1978 | Olafson | A01K 69/08 | 43/100 |
| 4,156,984 A * | 6/1979 | Kinser, Sr. | A01K 69/10 | 43/105 |
| 4,187,533 A * | 2/1980 | Hampton | A01K 97/00 | 362/158 |
| 4,214,399 A * | 7/1980 | Bradley | A01M 23/08 | 43/66 |
| 4,221,071 A * | 9/1980 | Sjolund | A01K 69/08 | 43/100 |
| 4,237,645 A * | 12/1980 | Kinser | A01K 69/06 | 43/102 |
| 4,258,496 A * | 3/1981 | Leone | A01K 69/08 | 43/102 |
| 4,429,659 A * | 2/1984 | Holyoak | A01K 63/02 | 119/223 |
| 4,538,376 A * | 9/1985 | Morton | A01K 69/08 | 43/100 |
| 4,611,424 A * | 9/1986 | Tarantino | A01K 69/08 | 43/100 |
| 4,648,199 A * | 3/1987 | Deaton | A01K 69/08 | 43/100 |
| 4,648,200 A * | 3/1987 | Miller | A01K 69/08 | 43/100 |
| 4,697,374 A * | 10/1987 | Simms | A01K 85/01 | 43/17.1 |
| 4,843,756 A * | 7/1989 | Wyman | A01K 69/06 | 43/102 |
| 4,848,025 A * | 7/1989 | Wyman | A01K 69/06 | 43/100 |
| 4,887,381 A * | 12/1989 | Tieben | A01M 23/18 | 43/66 |
| 4,905,405 A * | 3/1990 | Hendricks | A01K 69/08 | 43/100 |
| 4,959,922 A * | 10/1990 | Rhodes | A01K 69/08 | 43/100 |
| 5,009,189 A * | 4/1991 | Neff | A01K 31/08 | 119/200 |
| 5,119,584 A * | 6/1992 | Rhodes | A01K 69/06 | 43/100 |
| 5,168,653 A * | 12/1992 | Wyman | A01K 69/06 | 43/100 |
| 5,218,781 A * | 6/1993 | Miller | A01K 69/10 | 43/100 |
| 5,259,809 A * | 11/1993 | Rainey, Jr. | A01K 69/06 | 119/213 |
| D344,318 S | 2/1994 | Steinman | | |
| 5,347,747 A * | 9/1994 | Henriques | A01M 23/18 | 43/61 |
| 5,351,435 A * | 10/1994 | Hill | A01K 69/10 | 43/100 |
| 5,386,663 A * | 2/1995 | Fields | A01M 23/08 | 43/66 |
| 5,651,209 A * | 7/1997 | Rainey | A01K 97/00 | 362/34 |
| 5,771,627 A | 6/1998 | Mattson | | |
| 5,862,624 A * | 1/1999 | Askins | A01M 23/18 | 43/58 |
| 5,924,237 A * | 7/1999 | Ives | A01K 69/10 | 43/100 |
| 5,946,850 A * | 9/1999 | Sarkisyan | A01K 69/06 | 43/100 |
| 5,979,105 A * | 11/1999 | Marks | A01M 23/02 | 43/61 |
| 6,035,575 A * | 3/2000 | Hilty | A01K 69/06 | 43/100 |
| 6,772,555 B2 * | 8/2004 | Evans | A01M 23/20 | 43/61 |
| 7,313,887 B2 | 1/2008 | Hibbs | | |
| 7,874,097 B2 * | 1/2011 | Goodwin, III | A01K 69/08 | 119/213 |
| 7,886,480 B2 | 2/2011 | Philbrook | | |
| 7,913,448 B2 * | 3/2011 | December | A01K 69/06 | 43/100 |

(56) References Cited

U.S. PATENT DOCUMENTS

| | | | |
|---|---|---|---|
| 8,117,783 B2* | 2/2012 | Hilty | A01K 69/06 |
| | | | 43/100 |
| 9,572,328 B1* | 2/2017 | Head | A01K 69/06 |
| 2014/0259873 A1* | 9/2014 | Zhu | A01M 23/08 |
| | | | 43/61 |

FOREIGN PATENT DOCUMENTS

| | | | | |
|---|---|---|---|---|
| JP | 02231027 A | * | 9/1990 | |
| JP | 2651899 B2 | * | 9/1997 | |
| JP | 2016214214 A | * | 12/2016 | |
| WO | WO-2007043948 A1 | * | 4/2007 | A01K 69/08 |

OTHER PUBLICATIONS

Crab trap by Kevin's Crab Traps, Item# KCTRAP for retail sale [online]. AllTackle.com [retrieved Dec. 22, 2015]. Retrieved from the Internet: at <http://www.alltackle.com/crabbing_supplies.htm>.

* cited by examiner

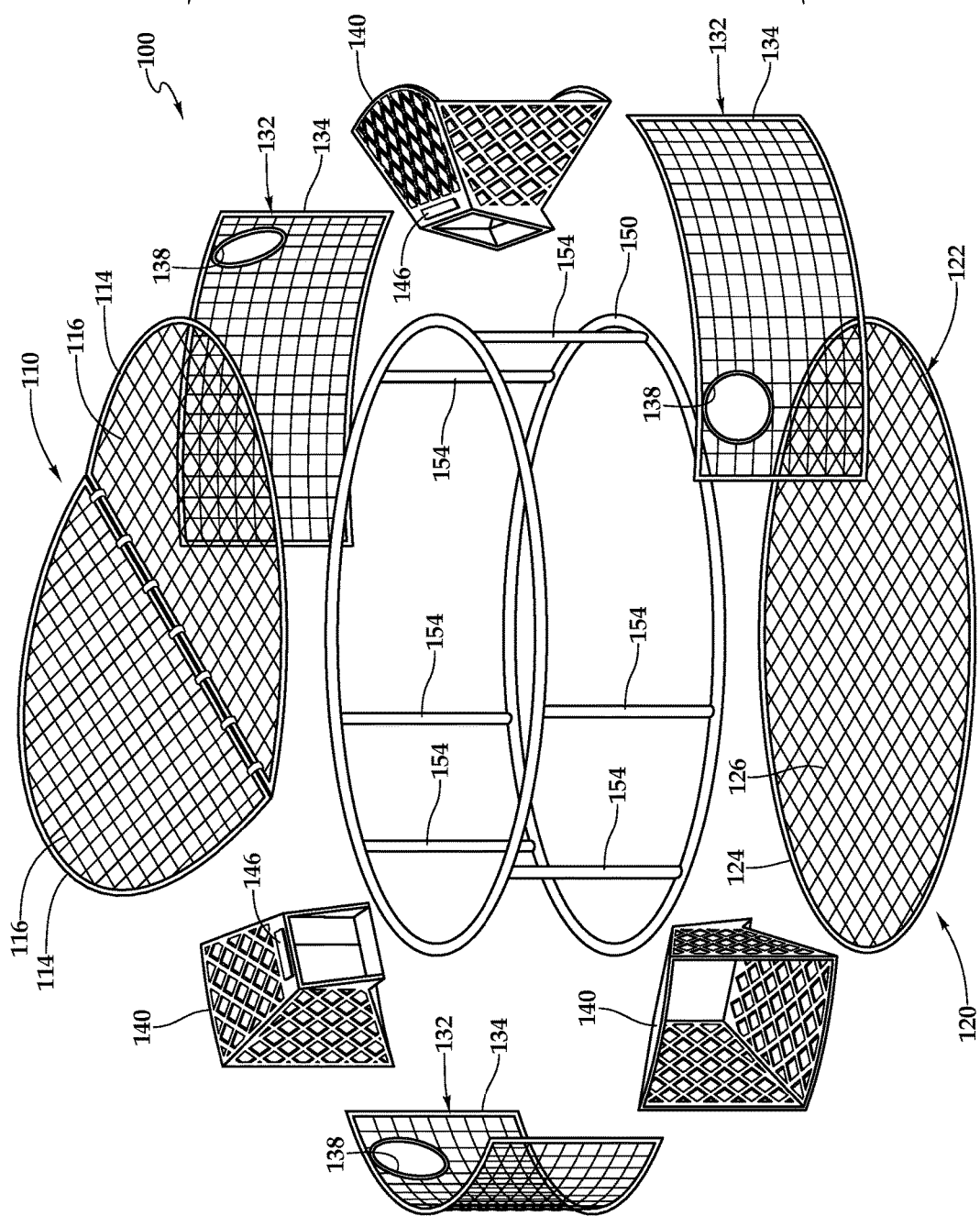

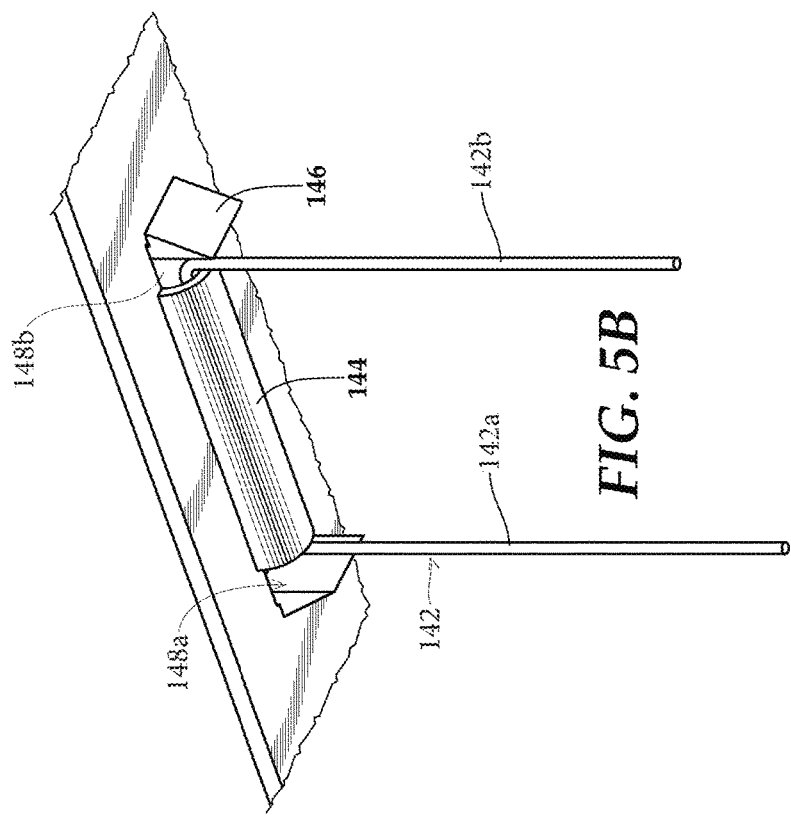
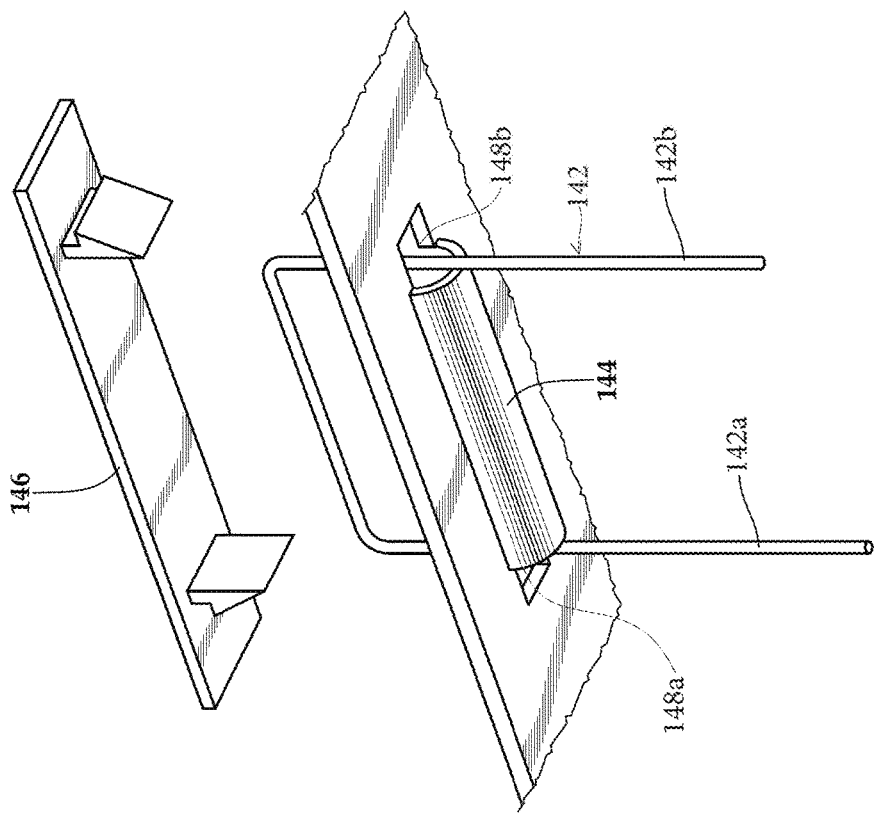
FIG. 5A
FIG. 5B

CRAB POT

FIELD OF THE INVENTION

The present invention relates to crab pots and improved designs for crab pots.

INTRODUCTION

Crabs are harvested by lowering baited crab pots in area in the ocean where crabs are known to be present. The crabs are attracted to the bait inside the pot and enter the pot through one or more tunnels to find the bait. In general, crab pots have an enclosure-type trapping system within them which permits crabs and other animals to enter the trap but not escape.

In use, crab pots are tied to a buoy via line so that the buoy will float above the crab pot to show where the crab pot is located beneath on the ocean floor. After the suitable period of time has passed the crabber will then pull the pots out of the salt water using the line tied onto the buoy at one end and the crab pot on the other end.

Crab pots are designed to withstand fairly extreme conditions during use, including being immersed in salt water during their usage. Nevertheless, the basic crab pot design has remained unchanged for many years.

SUMMARY OF THE INVENTION

In one aspect, a crab pot including a top, a bottom, and at least one side wall disposed between the top and the bottom, the top, bottom, and the at least one side wall being supported by a frame and enclosing an interior space. The crab pot further includes at least one entrance tunnel in the at least one side wall to permit entry of an animal into the interior space, the at least one entrance tunnel including a first end adjacent the at least one side wall and a second end opposite the first end, the second end disposed within the interior space. The crab pot also includes a trigger including at least one rod pivotably mounted at the second end of the at least one entrance tunnel wherein the trigger pivots away from the first end of the at least one tunnel into the interior space, and wherein the trigger includes a pivotable portion which is mounted on an upper portion of the at least one entrance tunnel near the second end.

In another aspect, a crab pot including a top, a bottom, and at least one side wall disposed between the top and the bottom, the top, bottom, and the at least one side wall being supported by a frame and enclosing an interior space. The crab pot further includes at least one entrance tunnel in the at least one side wall to permit entry of an animal into the interior space, the at least one entrance tunnel including a first end adjacent the at least one side wall and a second end opposite the first end, the second end disposed within the interior space. The crab pot also includes a trigger including at least one rod pivotably mounted at the second end of the at least one entrance tunnel, wherein the side wall includes at least one side wall panel removably attached to the frame.

In yet another aspect, a crab pot including a top, a bottom, and at least one side wall disposed between the top and the bottom, the top, bottom, and the at least one side wall being supported by a frame and enclosing an interior space. The crab pot further includes at least one entrance tunnel in the at least one side wall to permit entry of an animal into the interior space, the at least one entrance tunnel including a first end adjacent the at least one side wall and a second end opposite the first end, the second end disposed within the interior space. The crab pot also includes a trigger including at least one rod attached to a pivotable portion, the at least one rod pivotably mounted via the pivotable portion on an upper portion near the second end of the at least one entrance tunnel, wherein the trigger pivots away from the first end of the at least one tunnel into the interior space; and a trigger cover disposed over the pivotable portion of the trigger.

Other aspects of the invention will become apparent by consideration of the detailed description and accompanying drawings.

BRIEF DESCRIPTION OF THE DRAWINGS

FIG. 4 is an exploded perspective view of a crab pot according to embodiments of the invention.

FIG. 5A is an exploded perspective view of a trigger for use with a crab pot according to embodiments of the invention.

FIG. 5B is a perspective view of a trigger for use with a crab pot according to embodiments of the invention.

DETAILED DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Crab pots (or crab traps) provide a relatively efficient way to live-trap crabs and other bottom-dwelling aquatic animals, particularly in marine environments. In general, crab pots provide an enclosure with openings that permit crabs or other animals to enter the enclosure but which are designed to make it difficult or impossible for the animals to leave the enclosure. One or more additional openings may be provided in the crab pot which permit certain animals (e.g. other species or smaller juveniles of the desired species) to exit the crab pot while retaining the desired specimens. Typically, bait is placed inside the crab pot (often in an enclosure to prevent the bait from being consumed) to attract crabs or other animals.

A mechanism called a trigger is generally employed at the entrance, the trigger being a unidirectional mechanism designed to allow an animal to move in one direction (into the crab pot) but not the opposite direction (out of the crab pot). Typically made of wire, the trigger may be rendered ineffective if it is fouled by being tangled in seaweed or other materials, e.g. causing the trigger to stick in the open position.

In general, conventional crab pots have a frame with netting strung around the frame. When the netting breaks, some or all of the netting must be replaced, which is a time-consuming process that must be done by hand. Furthermore, in many crab pot designs holes are provided in the frame through which netting is strung, however these holes often corrode and lead to degradation of the frame.

Accordingly, the crab pot disclosed herein includes improvements over conventional designs, including modular mesh panels that can be replaced without having to manually restring the entire crab pot, corrosion-resistant stainless steel mesh welded onto the modular panels, an improved trigger design that resists fouling from seaweed and other materials, and an entrance tunnel that can be made of brightly-colored (e.g. bright orange or yellow) material such as plastic for improved durability and visibility.

Figure 1:
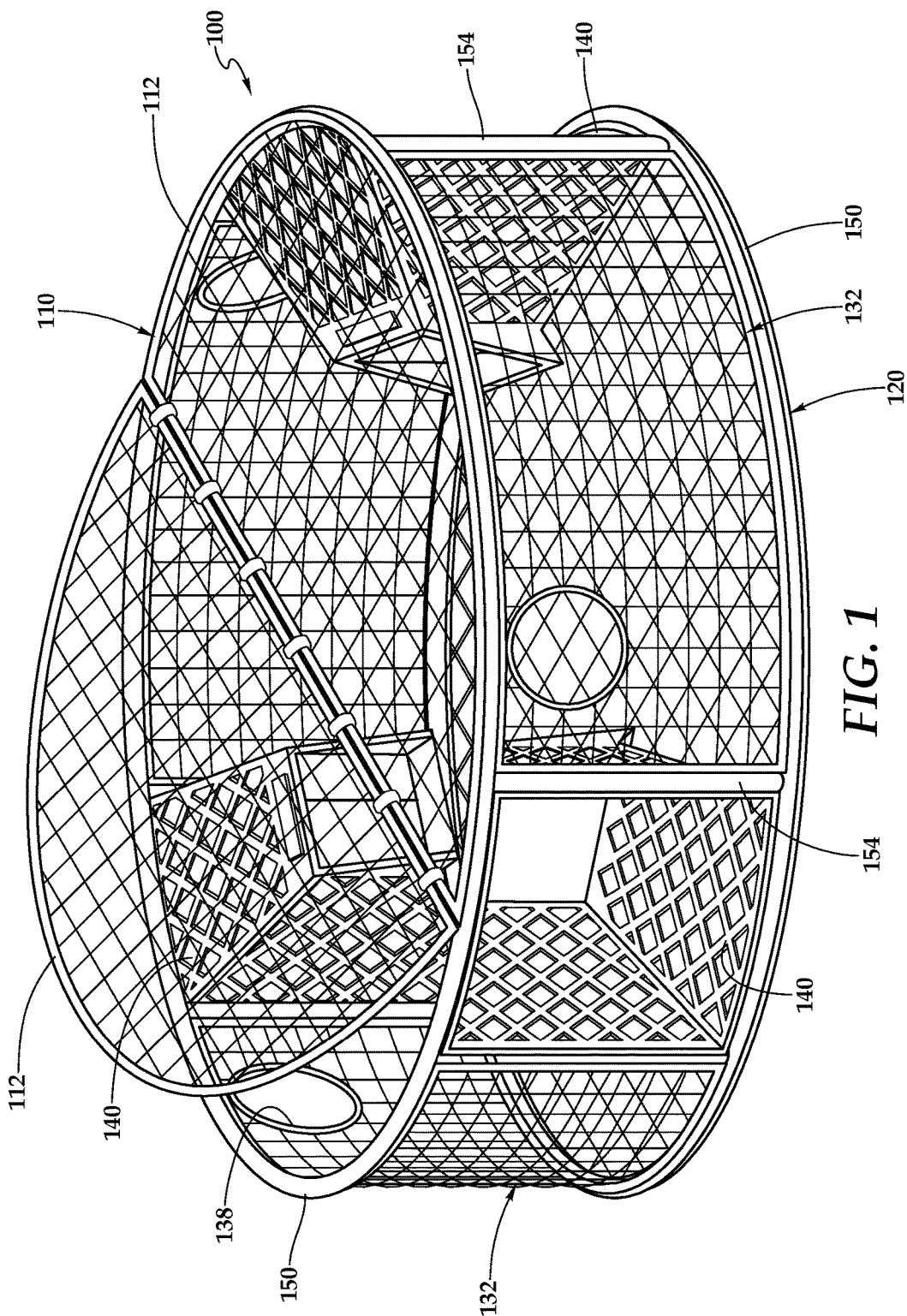
FIG. 1 is a perspective view of a crab pot according to embodiments of the invention.

Thus, provided herein is a crab pot 100 which, in various embodiments, includes a top 110, a bottom 120, and at least one side wall 130 disposed between the top 110 and the bottom 120 (FIG. 1). The top 110, bottom 120, and at least one side wall 130 are joined together to enclose an interior space within the crab pot 100. The crab pot 100 also includes at least one tunnel 140 to provide an entrance for crabs and other animals into the interior space of the crab pot 100 (FIGS. 1, 4).

Figure 2:
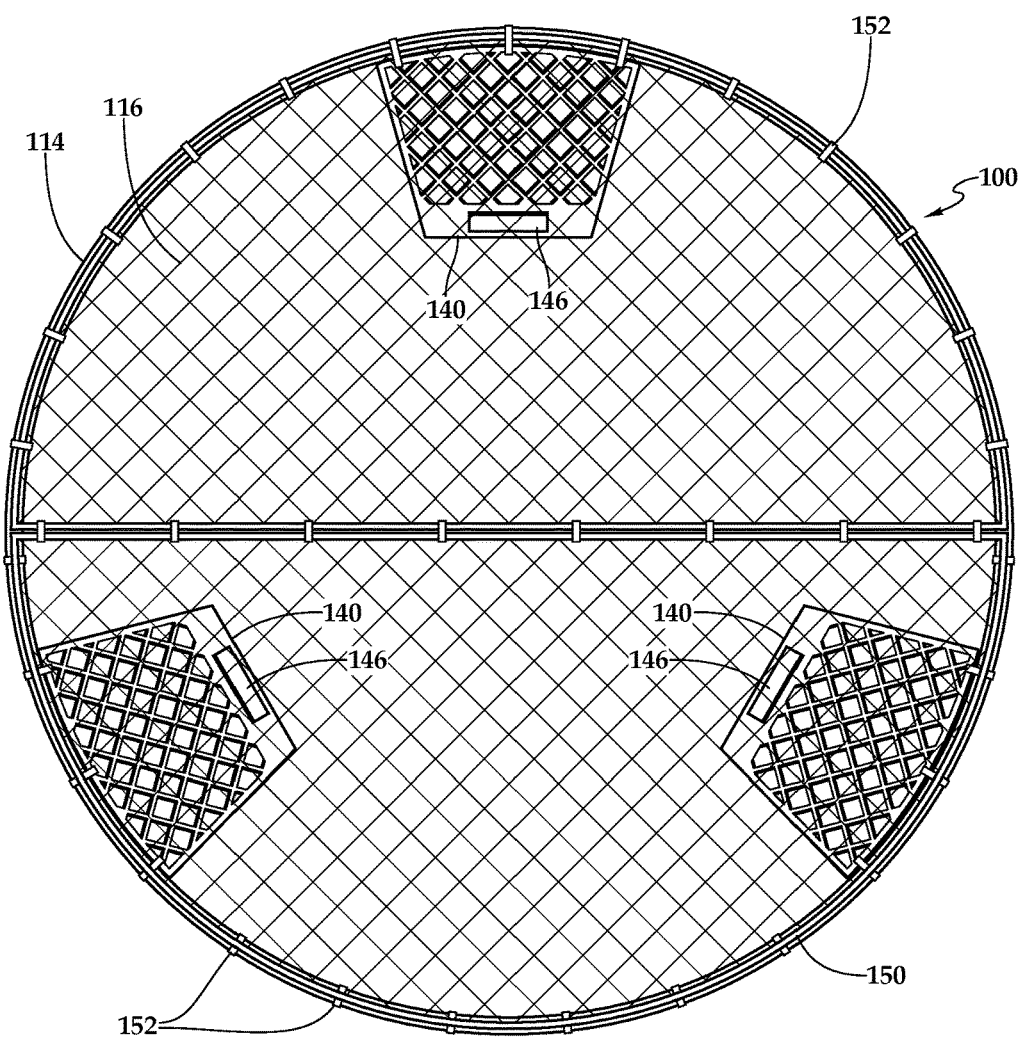
FIG. 2 is a top view of a crab pot according to embodiments of the invention.

The crab pot 100 includes a frame 150 to which the top 110, the bottom 120, the at least one side wall 130, and the at least one tunnel 140 are attached, for example using fasteners 152 such as stainless steel wire or bands or other suitable fasteners (FIG. 2). The frame 150 generally defines the shape of the crab pot 100, for example as shown in FIG. 1 the frame 150 helps define the overall cylindrical shape of the crab pot 100. In certain embodiments, the frame 150 is constructed from rigid wire made of corrosion-resistant metal such as stainless steel. In some embodiments, the frame 150 may have a coating of rubber, plastic, or other material to protect the metal of the frame 150 from damage, e.g. due to corrosion from sea water.

Figure 3:
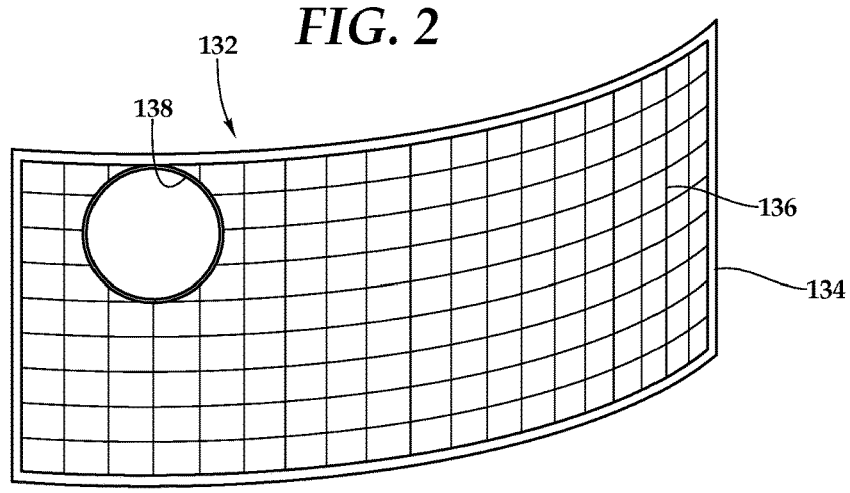
FIG. 3 is a perspective view of a side panel for use with a crab pot according to embodiments of the invention.

In one particular embodiment, the crab pot 100 has a cylindrical shape which includes a single continuous side wall 130 having three side wall panels 132 and three tunnels 140 fastened to the frame 150 (FIGS. 1, 3, 4). In other embodiments, the crab pot 100 may have a square, rectangular, pyramid, or other shape. In the latter embodiments, the crab pot 100 includes more than one side wall 130, each of which may include one or more tunnel 140 mounted therein or adjacent thereto. In various embodiments, the crab pot 100 may include one, two, three, four, or other numbers of tunnels 140.

In various embodiments, the at least one tunnel 140 has a first end that is generally adjacent the at least one side wall 130 and a second end that is disposed within the interior space of the crab pot 100. In some embodiments, the tunnel 140 is tapered such that the first end is larger than the second end. The tapered shape of the tunnel 140 facilitates animals entering the crab pot 100 while making it relatively difficult for them to escape. The sides of the tunnel 140 may be made of solid material or made be a mesh or lattice, as shown in the drawings.

In general, the first end of the tunnel 140 is the same height as the side wall 130 so that the tunnel 140 may be attached directly to the frame 150. In certain embodiments, the frame 150 may include vertical posts 154 to which the tunnels 140 may be attached (FIG. 4). The tunnel 140 may be made as a single three-dimensional piece (e.g. by injection molding of plastic) or may be made of one or more flat, generally two-dimensional components that are assembled into the final three-dimensional shape of the tunnel 140. In some embodiments, the first end of the tunnel 140 has a curved profile to match the shape of the frame 150 when the crab pot 100 has an overall rounded or curved shape.

Figure 7:
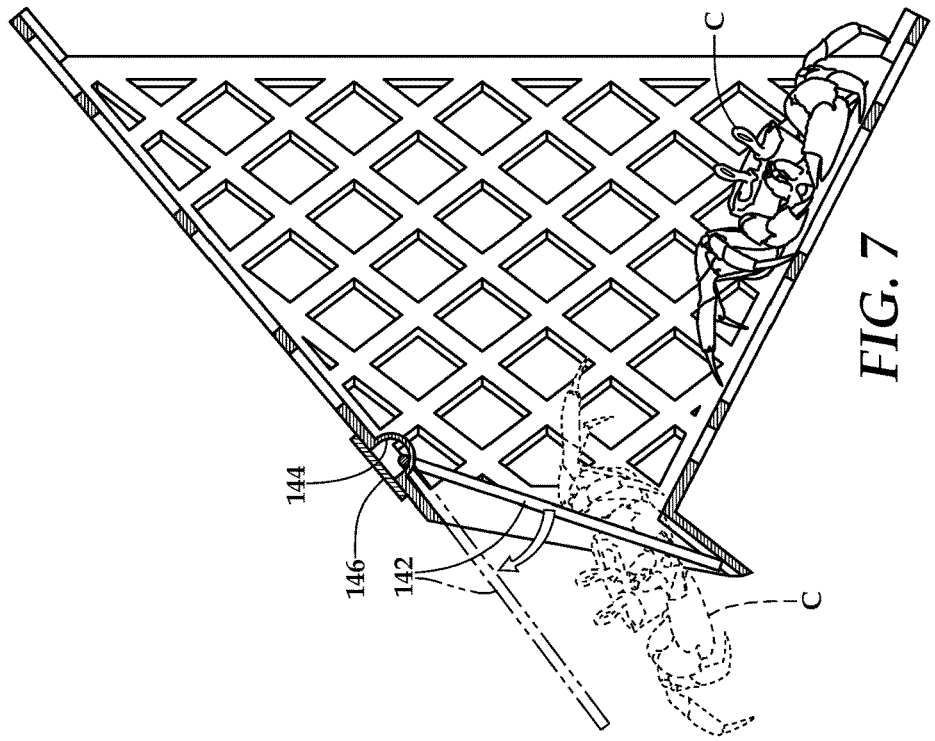
FIG. 7 is a cross-sectional view through the line 7-7 in FIG. 6 of a tunnel for use with a crab pot according to embodiments of the invention.

A trigger 142 is located at the second end of the tunnel 140 to permit the crab or other animal to enter the interior space of the crab pot 100 but not exit (FIGS. 5A, 5B, 6, 7). In certain embodiments, the trigger 142 includes at least one rod that is pivotably mounted at the second end of the crab pot 100 such that the trigger pivots inwardly, into the interior space, but does not pivot outwardly. Thus, an animal such as a crab (C) that crawls into the crab pot 100 can enter by moving past the inwardly-pivoting trigger 142 into the interior space but cannot exit the crab pot 100 because the trigger 142 does not pivot outwardly (FIG. 7). In various embodiments, the tunnel 140 may be molded or cast from a material such as plastic (e.g. polyurethane) and in particular embodiments the material may be a color or pattern that is bright and/or contrasts with the anticipated surroundings of the crab pot 100 in order to improve its visibility.

In the illustrated embodiments, the trigger 142 includes two rods that are vertically oriented and pivotably attached to the top of the tunnel 140 at the second end of the tunnel 140. In one particular embodiment the two rods that make up the trigger 142 may be formed by bending a single piece of stiff wire into an approximately U-shaped structure. More generally, the rod(s) of the trigger 142 are attached to a pivotable portion, which may be a separate piece of material to which the rods are attached or may be a section of the same rod or wire, as in the case of the U-shaped wire.

Figure 6:
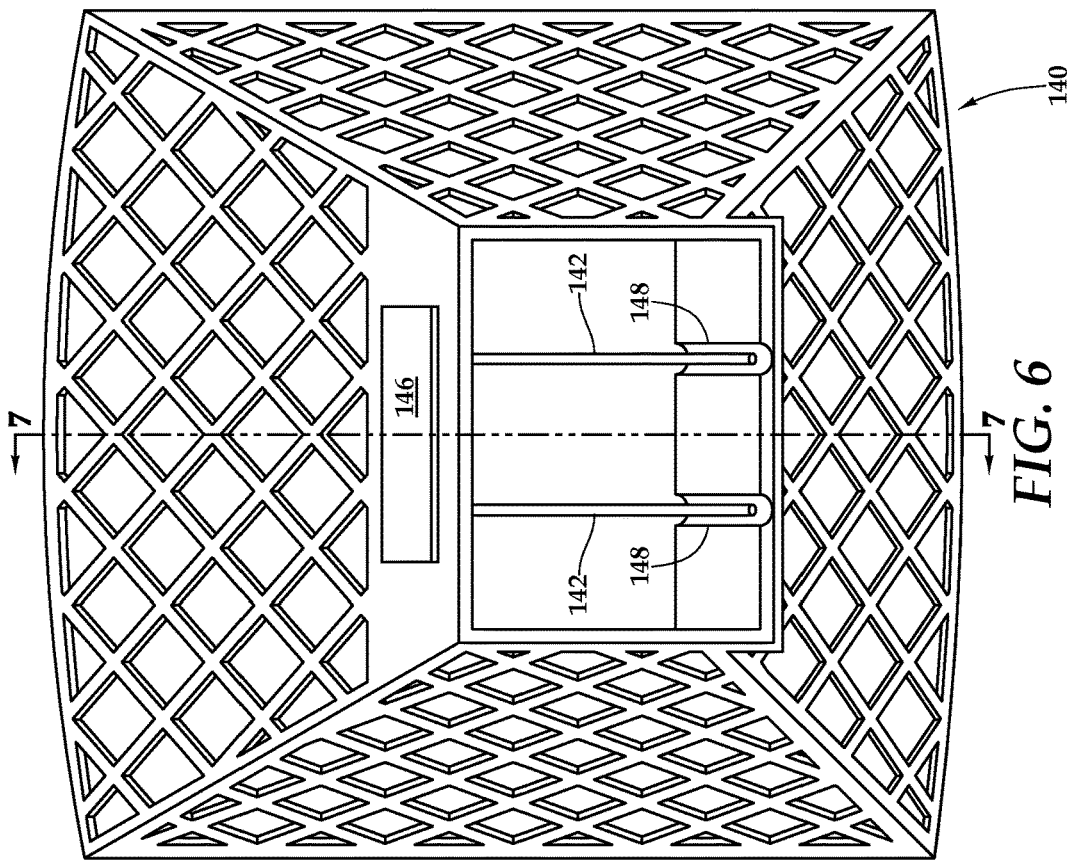
FIG. 6 is a plan view of a tunnel for use with a crab pot according to embodiments of the invention.

The pivotable portion of the trigger 142 is attached to the tunnel by a trigger mount 144, which in one embodiment is an indentation in a wall of the tunnel 140 to which the trigger is pivotably attached (FIGS. 5A, 5B, 7). In the particular example of a trigger made from a single piece of stiff wire formed into U-shaped structure, a central portion of the U-shaped structure is attached to the trigger mount 144. FIG. 5A further illustrates that the example trigger 142 defines first and second rods 142a and 142b and the example trigger mount 144 further defines first and second trigger openings 148a and 148b, one located at each end of the trigger mount 144. FIG. 5A further illustrates that the first and second rods 142a and 142b extend through the first and second trigger openings 148a and 148b, respectively. In certain embodiments, the second end of the tunnel 140 includes indentations 148 to receive the rods of the trigger 142 when the trigger 142 is in a closed position. To facilitate engagement with the rods of the trigger 142, the indentations 148 may be included on a slanted portion that projects outward from the bottom of the second end of the tunnel 140, with the result that the rods of the trigger 142 may be held in an angled, rather than a vertical, position (FIGS. 6, 7). The indentations 148 help stabilize the trigger 142 in its closed position and make it less likely that a crab or other animal will be able to escape the crab pot 100.

To reduce or prevent fouling of the trigger 142 with debris such as plants (e.g. seaweed), the trigger 142 is mounted such that the point of pivoting attachment is shielded from above, for example by being recessed from the end of the tunnel 140 and mounted within a flat section of the tunnel 140 (FIGS. 5A, 5B, 6, 7). For certain embodiments including when the tunnel 140 is cast or molded from a material such as plastic (e.g. polyurethane), the trigger mount 144 may include a depression that is sized to receive the central portion of the U-shaped trigger structure. To further shield the pivoting mechanism from debris, the trigger mount 144 in certain embodiments is capped by a trigger cover 146 (FIGS. 5A, 5B, 6, 7). In one particular embodiment, the trigger cover 146 snaps over the trigger mount 144 and covers the pivoting mechanism, although other designs and attachment mechanisms for the trigger cover 146 are also possible.

In addition to the trigger 142 that is illustrated in the drawings which has two rods, in other embodiments the trigger 142 may instead have one, three, other any other number of rods. Further, in cases where the trigger 142 has two or more rods, the rods may be joined as a single unit that pivots together, as illustrated in the drawings, or each of the rods may pivot independently of the other rods. In general, the number of rods needed to form the trigger 142 and the spacing between the rods may be determined by the size of the opening at the second end of the tunnel 140 as well as the size of the animals that the crab pot 100 is intended to retain.

The side wall 130 may be constructed from one or more side wall panels 132, each of which includes a side wall frame 134 with mesh 136 attached (e.g. welded) to the side wall frame 134 (FIG. 3). The side wall panels 132 can be easily removed (by uncoupling the fasteners 152) and replaced if they are damaged or worn. In certain embodiments, the side wall panels 132 may include an escape opening 138 to permit smaller animals to leave the crab pot 100 while retaining animals of the correct size.

The top 110 may be divided into two or more portions with at least one of the portions being removable or hingedly attached to the frame 150 to permit access to the interior space of the crab pot 100; the hingedly attached top portion may be secured in a closed position with a latch or other mechanism. As with the side wall 130, the separate portions of the top 110 may each be made of modular top panels 112, each of which may include a top frame 114 with mesh 116 attached (e.g. welded) to the top frame 114. In various embodiments at least a portion of the top 110 includes biodegradable mesh 116' (e.g. mesh made from a suitable biodegradable plastic or cotton material). If the crab pot 100 is lost in the water the biodegradable mesh 116' disintegrates so that animals are not permanently trapped.

The bottom 120 may be made of one or more portions that can be removably attached to the frame 150. The separate portions of the bottom 120 may each be made of modular bottom panels 122, each of which may include a bottom frame 124 with mesh 126 attached (e.g. welded) to the bottom frame 124.

Any of the components of the crab pot 100 may be made of plastic (e.g. polyurethane), stainless steel, galvanized steel, or other suitable materials. In some embodiments, a portion of the side wall 130 may include biodegradable material to permit animals to escape the crab pot 100 if it is not retrieved from the water for a prolonged period.

Among other advantages, the modular design of the disclosed crab pot 100 allows individual parts to be replaced and also allows parts to be salvaged from damaged crab pots 100 to be used to repair other units. The use of pre-made, welded mesh components for the top 110, bottom, 120, and at least one side wall 130 permits more efficient manufacture of parts and easier replacement of units that are in use. The modular construction of the tunnels 140, particularly as molded plastic elements, also permits simpler, more efficient manufacture and assembly of the crab pots 100 as well as easier replacement of damaged parts. The modular design will provide crab pots that are more cost-effective to purchase and maintain over time.

Various features and advantages of the invention are set forth in the following claims.

What is claimed is:

1. A crab pot, comprising:
   a top, a bottom, and at least one side wall disposed between the top and the bottom, the top, bottom, and the at least one side wall being supported by a frame and enclosing an interior space;
   at least one entrance tunnel in the at least one side wall to permit entry of an animal into the interior space, the at least one entrance tunnel being made of injection molded plastic and including a first end adjacent the at least one side wall, a second end opposite the first end, and a trigger mount monolithically formed in a flat section of the at least one entrance tunnel, where the second end is disposed within the interior space and the trigger mount defines a depression in the flat section of the at least one entrance tunnel;
   a trigger comprising at least one rod attached to a pivotable portion, the trigger pivotably mounted via the pivotable portion recessed in the depression in the flat section and on an upper portion of the at least one entrance tunnel at the second end of the at least one entrance tunnel, wherein the trigger pivots away from the first end of the at least one entrance tunnel into the interior space and wherein the depression receives the pivotable portion of the trigger such that the pivotable portion is recessed within the flat section of the at least one entrance tunnel; and
   a trigger cover detachably attached to the at least one entrance tunnel to cover the depression such that the pivotable portion of the trigger is covered.

2. The crab pot of claim 1, wherein the second end of the at least one entrance tunnel comprises a plurality of indentations at a lower end thereof, and wherein the at least one rod fits into one of the plurality of indentations when the trigger is in a closed position.

3. The crab pot of claim 2, wherein the second end of the at least one entrance tunnel comprises a plurality of indentations, wherein the at least one rod fits into one of the plurality of indentations.

4. The crab pot of claim 3, wherein the at least one side wall comprises at least one side wall panel removably attached to the frame, and wherein the at least one side wall panel comprises a side wall frame having mesh attached thereto.

5. The crab pot of claim 4, wherein the at least one entrance tunnel is made of orange plastic.

6. The crab pot of claim 1, wherein the at least one rod of the trigger comprises a plurality of rods extending from the pivotable portion, and wherein the second end of the at least one entrance tunnel comprises a plurality of indentations, wherein each of the plurality of rods fits into one of the plurality of indentations.

7. A crab pot, comprising:
   a top, a bottom, and at least one side wall disposed between the top and the bottom, the top, bottom, and the at least one side wall being supported by a frame and enclosing an interior space;
   at least one entrance tunnel in the at least one side wall to permit entry of an animal into the interior space, the at least one entrance tunnel being made of injection molded plastic and including a trigger mount defining a depression monolithically formed in a flat section of the at least one entrance tunnel, the at least one entrance tunnel including a first end adjacent the at least one side wall, and a second end opposite the first end, the second end disposed within the interior space;

a trigger comprising a pivotable portion and at least one rod, where the pivotable portion is arranged within the depression such that the trigger is pivotably mounted at the second end of the at least one entrance tunnel; and a trigger cover;

wherein the at least one side wall comprises at least one side wall panel removably attached to the frame;

wherein the depression receives the pivotable portion of the trigger such that the pivotable portion is recessed within the depression formed in the flat section of the at least one entrance tunnel;

wherein the trigger pivots away from the first end of the at least one entrance tunnel into the interior space; and wherein the trigger cover is detachably attached to the at least one entrance tunnel such that the trigger cover covers the depression and the pivotable portion of the trigger.

8. The crab pot of claim 7, wherein the second end of the at least one entrance tunnel comprises at least one indentation at a lower end thereof, and wherein the at least one rod fits into the at least one indentation when the at least one rod is in a closed position.

9. The crab pot of claim 8, wherein the at least one rod of the trigger comprises a plurality of rods extending from the pivotable portion of the trigger, and wherein the at least one indentation of the second end of the at least one entrance tunnel comprises a plurality of indentations, wherein each of the plurality of rods fits into one of the plurality of indentations.

* * * * *